May 4, 1965

C. A. BOYD 3,182,214

SUBMERSIBLE MOTOR SEAL SECTION

Filed Dec. 26, 1962

INVENTOR.
CLINTON A. BOYD
BY
*Lyon & Lyon*
ATTORNEYS

INVENTOR.
CLINTON A. BOYD

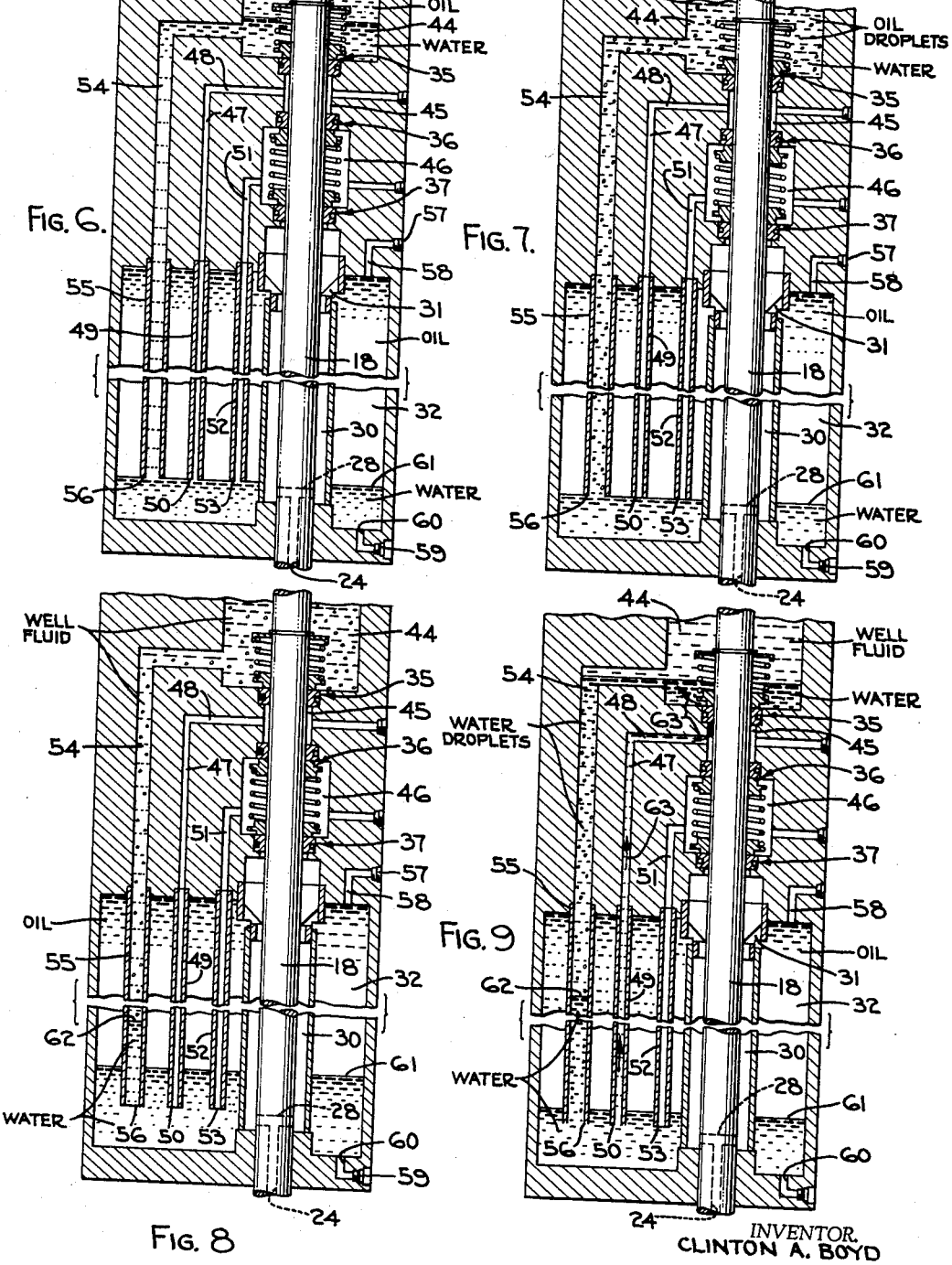

United States Patent Office 3,182,214
Patented May 4, 1965

3,182,214
SUBMERSIBLE MOTOR SEAL SECTION
Clinton A. Boyd, Tulsa, Okla., assignor to Borg-Warner Corporation, Chicago, Ill., a corporation of Illinois
Filed Dec. 26, 1962, Ser. No. 247,188
7 Claims. (Cl. 310—87)

This invention relates to a submersible type seal section for a submersible motor driving a pump and, in particular, is directed to such a seal section for preventing communication between the ambient fluid and the lubricating fluid contained within the motor.

There are many uses for submersible motor and pump units such as pumping fluid from deep oil or water wells. The electric motors of these submersible motor and pump units are usually filled with a fluid which serves both as a coolant and as a lubricating fluid for the moving parts of the motor. A seal section is interposed between the motor and pump for retaining this fluid within the motor and for preventing the ambient fluid that is being pumped by the pump from entering the motor. If the lubricating and cooling fluid is discharged from the motor or the ambient fluid is allowed to enter the motor serious damage can result to the windings and bearings of the motor. The ambient fluid would damage the motor due to the water and impurities usually found in this fluid.

For a submersible motor and pump installation in deep wells to be practical, the pump and motor must be capable of an extended period of use and, therefore, even a very slow rate of leakage of motor fluid or intrusion of ambient fluid is unacceptable. An additional difficulty which is encountered with these submersible motor and pump units is that the lubricating and cooling fluid within the motor changes volume due to changes in temperature caused by cycling on and off of the motor and the expansion and contraction of this fluid must be accommodated.

Recently there has been developed a seal section for submersible electrical motor and pump units which overcomes the previous shortcomings of conventional seal sections. That seal section employs a chamber filled with the motor fluid and a breather pipe communicating the chamber with the ambient fluid to permit expansion and contraction of the ambient fluid. Further, that seal section is provided with passageways whereby the failure of any of the rotary seals surrounding the driving shaft merely causes circulation of fluid from the chamber through the leaking seal and the fluid is returned to the chamber. However, with that seal section there is communication between the motor lubricating and cooling fluid and the ambient fluid which can result in contamination of the motor fluid by the ambient fluid to such an extent as to cause damage to the motor windings and bearings by circulation of the contaminated motor fluid. This has been found particularly true with oil wells where the ambient fluid is a low gravity crude having a high oil cut of low gravity. This adverse effect is apparently due to this ambient fluid mixing or dissolving in the motor fluid that is within the seal section and having entrained moisture which is carried through the seal section and into the motor.

Accordingly, it is a principal object of this invention to provide a seal section for a submersible motor wherein the internal motor fluid is not permitted to come in contact with the ambient fluid.

A further object of this invention is to provide a novel arrangement of a seal section for submersible electric motor and pump unit wherein an intermediate fluid serves as a barrier to separate the motor lubricating and cooling fluid from the ambient fluid during expansion or contraction of the motor fluid or leakage of the rotary seals of the seal section.

Another object of this invention is to provide a seal section for submersible electric motor and pump unit wherein a chamber is provided for accommodating the motor fluid and an intermediate fluid with the intermediate fluid occupying at least a portion of a breather tube that is in communication with the ambient fluid for preventing communication between the ambient fluid and the motor fluid. A still further object is to provide such an arrangement wherein the intermediate fluid has a higher specific gravity than either the motor fluid or the ambient fluid and, therefore, continually occupies the lower portion of the chamber and the lower portion of the breather tube to prevent the loss of motor fluid or intrusion of ambient fluid through the breather tube.

Other and more detailed objects and advantages of this invention will appear from the following description and the accompanying drawings.

In the drawings:

FIGURE 1 is a sectional elevation view illustrating a typical submersible electric motor and pump unit positioned in a bottom of a well bore and having the seal section of this invention interposed between the motor and pump.

FIGURES 2a and 2b comprise a sectional elevation view of the seal section taken substantially on the line 2—2 as shown in FIGURE 1 with FIGURE 2a illustrating approximately the upper one-half of the seal section, and FIGURE 2b illustrating approximately the lower one-half of the seal section.

FIGURE 3 is a sectional plan view taken substantially on the line 3—3 shown in FIGURE 2a.

FIGURES 6, 7, 8, and 9 are diagrammatical sectional elevations of the seal section showing the various tubes and ports that are shown in FIGURES 2a, 2b, 4, and 5 as lying in a single plane for purposes of explanation although it is to be realized that these tubes and ports are angularly displaced from each other in the actual embodiment. These FIGURES 6, 7, 8, and 9 illustrate four different conditions and relative positions of the fluids within the seal section.

Figure 1:
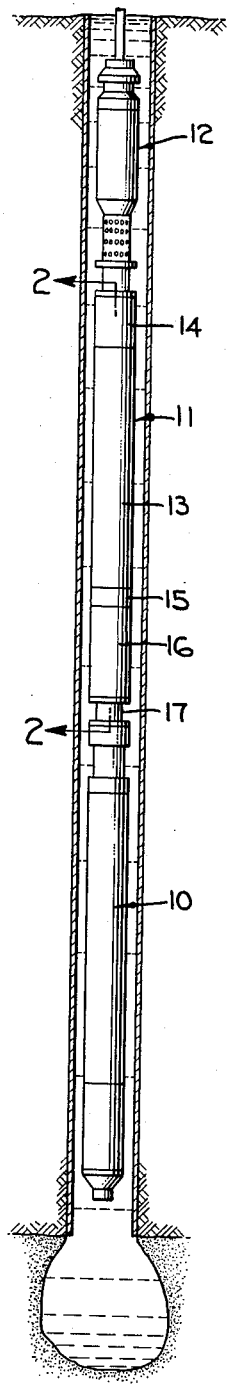
Figure 3:
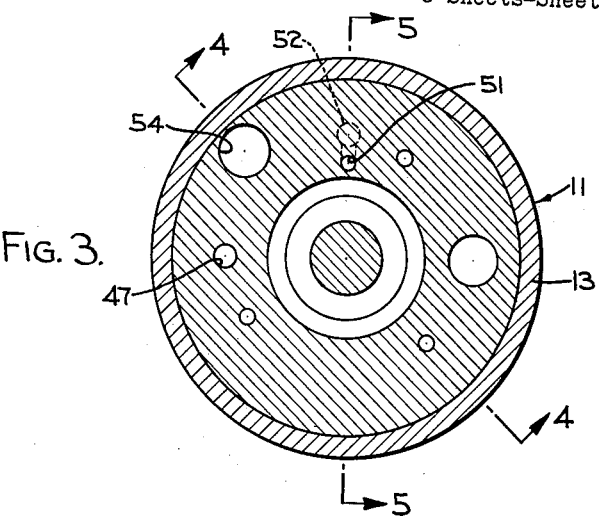

Referring now to FIGURE 1 the electric motor, generally designated 10, has its upper end connected to the seal section, generally designated 11, of this invention. The upper end of seal section 11 is connected to the pump, generally designated 12. The shaft of the motor 10 drives a shaft passing through the seal section 11 which in turn drives the shaft of pump 12.

The seal section 11 may include a tubular housing 13 having its upper end connected to a seal retainer 14 and its lower end connected to a partition member 15 with a second tubular housing 16 extending below and connected to the member 15, and a connector head 17 joined to the lower end of houisng 16. These members are axially aligned and connected in sealing relationship by any convenient means for rotatably and sealably supporting the shaft 18 passing therethrough. The upper end of shaft 18 is provided with a splined connection to the shaft of pump 12 and the lower end of shaft 18 is provided with a splined connection to the shaft of motor 10.

A support tube 19 having an internal diameter larger than the diameter of the shaft 18 encircles the shaft 18 and is mounted at its lower end in the partition member 15 and supported at its upper end by retainer 20, which is in turn mounted in the lower end of seal retainer 14. A plurality of sleeve-type bearings 21 are mounted in the support tube 19 for rotatably supporting the shaft 18. Also, a ball bearing assembly 22 is mounted in the seal retainer 14 for assisting in rotatably supporting the shaft 18.

As is conventional with certain types of seal sections for submersible motors, the tubular housing 16 may be provided with a thrust bearing assembly, generally designated 23, which serves the two functions of rotatably supporting the shaft 18 against axial thrust and appropriately circulating the lubricating and cooling fluid to and from the motor 10. The shaft 18 is provided with an axial internal bore 24 which communicates with a like or similar passage in or around the shaft of the motor 10 and communicates with lateral passages 25 in the thrust bearing assembly 23 whereby the motor fluid is circulated upwardly through bore 24, outwardly through bores 25, and downwardly between the thrust assembly 23 and the tubular housing 16. Spiral grooves 26 are provided for permitting this downward circulation. The circulating motor fluid passes inwardly through bores 27 and then dowardly through the motor 10 between the windings to accomplish the cooling and lubricating functions. Lateral bores 28 are provided in the shaft 18 in communication with the axial bore 24 to allow the motor fluid to pass upwardly or downwardly through passageway 29 in the partition member 15 and the annular passageway 30 formed between the support tube 19 and the shaft 18. The sleeve bearings 21 are provided with conventional grooving to permit passage of fluid through the sleeve bearings in the annular passageway 30. The retainer 20 is provided with ports 31 for permitting the exchange of fluid between the annular passageway 30 and the annular chamber 32 formed between the exterior of the support tube 19 and the interior of the tubular housing 13. Chamber 32 extends from the seal retainer 14 to the partition member 15. Thus, it may be seen that chamber 32 is in direct fluid communication with motor 10 through axial bore 24, lateral bores 28, passages 29, annular passageway 30, and the ports 31 so that expansion of the fluid within motor 10 results in the fluid expanding upwardly into chamber 32.

The open upper end 33 of seal retainer 14 is in direct communication with the ambient fluid and a sand cap 34 is mounted in seal retainer 14 and surrounds shaft 18 to prevent the intrusion of foreign particles into the remainder of the seal retainer 14. A plurality of rotary seals are provided in the seal retainer 14 for accomplishing a seal relationship between the retainer 14 and the shaft 18 and, as shown in the drawings, three rotary seals, generally designated 35, 36, and 37 are provided although more or fewer seals may be used. Each of the rotary seals 35, 36, and 37 is comprised of a rotating seal member 38 of a suitable material having a radial sealing surface 39 adapted to slidably engage the radial surface of a stationary sealing member 40. The seal member 38 of rotary seal 35 is resiliently urged toward the stationary seal ring 40 by means of a compressed coil spring 41 extending between the seal 38 and a snap ring 42 mounted on the shaft 18. The rotary seals 36 and 37 face in opposite axial directions and therefore a single coil spring 43 installed under appropriate compression extends between the seal members 38 of each of the rotary seals 36 and 37 to resiliently urge those seals toward their associated stationary sealing rings 40. The rotating seal member 38 of each rotary seal 35, 36, or 37 tightly fits the shaft 18 and rotates therewith. Each stationary seal ring 40 is appropriately supported in the seal retainer 14 or in an appropriate adapter mounted within the seal retainer with various seals being provided between rings 40 and retainer 14 such as the O-ring seals shown. By this arrangement any fluid passing between open end 33 and chamber 32 through these seals must pass between the slidably engaged radial surfaces of each seal member 38 and the associated ring 40.

The rotary seals 35, 36, and 37 effectively form three separate chambers surrounding the shaft 18 within the seal retainer 14. The first of these chambers is the chamber 44 formed above the uppermost seal 35 between that seal and the open end 33 of retainer 14. The second chamber 45 is formed between seals 35 and 36. The third chamber 46 is formed between seals 36 and 37. It is to be noted that the annular chamber 32 is in communication with the lower side of the lowermost rotary seal 37.

A bore 47 in retainer 14 communicates through a passageway 48 with the chamber 45 betweeen rotary seals 35 and 36. A tube 49 is threadedly attached in sealing relationship to the seal retainer 14 and communicates with bore 47. The tube 49 extends to the lower portion of the chamber 32 with its open end 50 terminating just above the partition member 15.

Figures 4, 5:
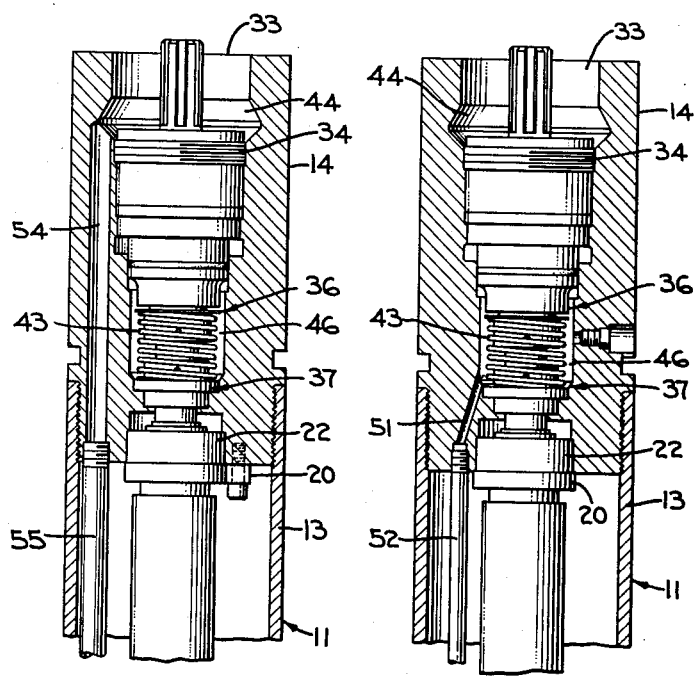
FIGURE 4 is a fragmentary sectional elevation view of the upper portion of the seal section taken substantially on the line 4—4 shown in FIGURE 3 and being angularly displaced from the plane of the sectional elevation of FIGURES 2a and 2b.
FIGURE 5 is a fragmentary elevation similar to FIGURE 4 and taken substantially on the line 5—5 of FIGURE 3.
Figure 2A:
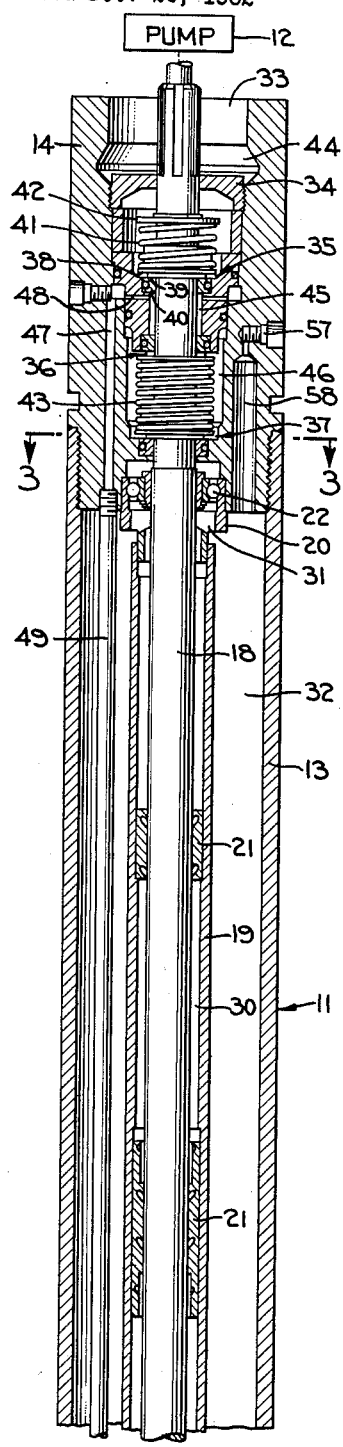
Figure 2B:
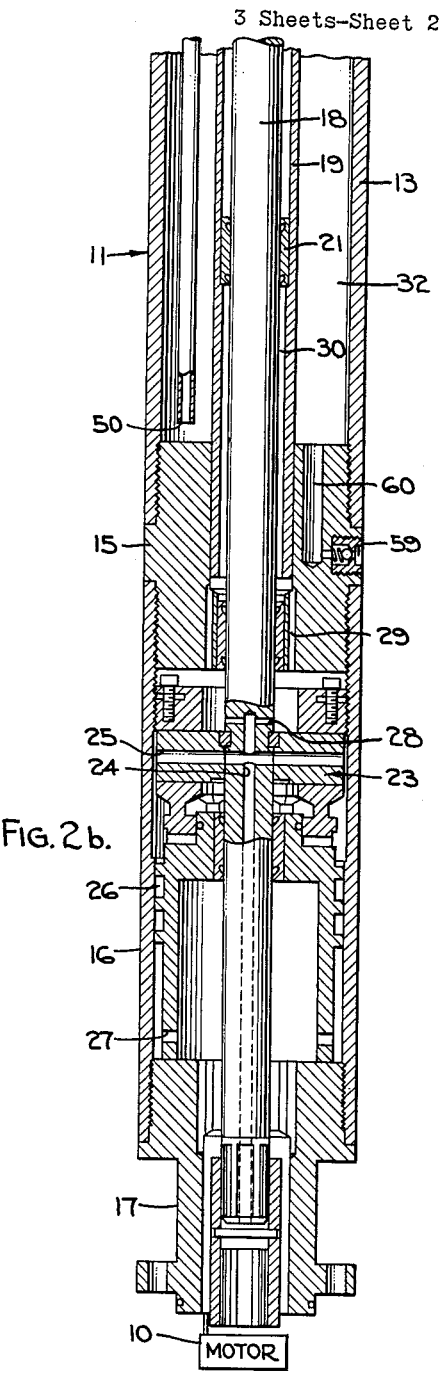

Referring particularly to FIGURE 5, a bore 51 in seal retainer 14 and angularly displaced from the bore 47 communicates with chamber 46. A tube 52 is joined in sealing relationship to the seal retainer 14 and communicates with the bore 51. The lower open end 53 (see FIGURES 6, 7, 8 and 9) of tube 52 is positioned in the lower portion of chamber 32 at substantially the same level as the open end 50 of tube 49.

Referring particularly to FIGURE 4, seal retainer 14 is provided with a bore 54 communicating with the uppermost chamber 44 in the seal retainer. A tube 55 is threadedly connected in sealing relationship to the seal retainer 14 and communicates with the bore 54. The lower open end 56 of tube 55 is positioned in the lower portion of chamber 32 at substantially the same level as open ends 50 and 53 of tubes 49 and 52, respectively. It is preferred that tube 55 have a relatively large internal diameter or be comprised of a plurality of tubes of smaller internal diameter so that the internal volume of the tube 55 or such plurality of tubes will be relatively large for the reasons hereinafter described. In contrast, the tubes 49 and 52 need only have a large enough internal diameter to permit the passage of fluid therethrough.

For purposes of this point in the description, it will be assumed that chamber 32 and annular passageway 30 are filled with a fluid through a filler plug 57 and a bore 58 in the seal retainer 14. It will also be assumed that tubes 49, 52 and 55 and chambers 44, 45 and 46 are filled with such fluid. Since chamber 44 is in communication with the ambient fluid and is therefore under the pressure of the ambient fluid and, further, since the various bores in passageways in retainer 14 are in communication through the tubes 49, 52 and 55, it may be seen that the fluid pressure on each side of each of the rotary seals 35, 36 and 37 is substantially the same. However, it has been found that even though the fluid pressure is the same on each side of a rotary seal of this type, there will be flow of fluid through the seal upon failure or malfunctioning of the seal during rotation of the shaft. Although the reasons that this type of seal causes such a flow upon failure of the seal are not entirely clear, the direction of flow is always the same and can be somewhat explained on the theory that the rotary seal functions as a centrifugal pump. Referring particularly to rotary seal 35, if this seal fails, there will be leakage between the radial surfaces of the rotating seal 38 and the stationary ring 40 and the direction of flow will be from chamber 45 into chamber 44 i.e., in an upward direction through the seal 35. Likewise, upon failure of seal 36, the flow of fluid will be from chamber 45 downwardly into chamber 46 since rotary seal 36 is in an inverted position in comparison to rotary seal 35. Similarly upon failure of rotary seal 37, the fluid flow will be from chamber 32 upwardly through the seal and into chamber 46.

In preparation for use of the submersible motor and pump unit and prior to lowering the unit into the well, the entire unit is assembled as previously described with the seal section 11 interposed between the motor 10 and the pump 12. The motor 10 and seal section 11 are then filled with the motor lubricating and cooling fluid through a fill plug (not shown) in the motor 10. Plug 57 is removed and bore 58 serves as a vent from chamber 32. After the motor and seal section have been filled, the plug 57 is reinstalled.

When the motor and seal section are filled with this fluid including the various tubes, bores, passageways and chambers in the seal section heretofore described, an intermediate fluid is introduced into the bottom of chamber 32 through a check valve filler plug 59 and passageway 60 in the partition member 15. Referring particularly to FIGURE 6, this intermediate fluid has a higher specific gravity than the previously introduced motor fluid and therefore will tend to fill the bottom portion of the chamber 32. Since plug 57 has been reinstalled, the introduction of intermediate fluid causes a displacement of some of the motor fluid upwardly through the tube 55, bore 54 and into chamber 44. The excess fluid is spilled out of the open end 33 of the seal retainer 14. The selected intermediate fluid is relatively non-soluble in the motor fluid and due to the difference in specific gravity an interface 61 is formed between the intermediate fluid and the motor fluid. Continued introduction of intermediate fluid through plug 59 and passageway 30 causes the interface 61 to rise within the chamber 32 urging the motor fluid upwardly through tube 55 until the interface 61 reaches the lower open end 56 of tube 55. At this point the intermediate fluid will begin to be urged upwardly through tube 55 and the amount of motor fluid within chamber 32 will remain constant. Introduction of intermediate fluid is continued until the motor fluid is completely displaced from tube 55, bore 54, and chamber 44 as may be observed by the discontinuance of motor fluid spilling out of the open end 33 and the beginning of intermediate fluid spilling out of the open end 33. The seal section is now appropriately filled for lowering the motor and pump unit into the well and this fluid condition is substantially shown by FIGURE 6.

The motor fluid may be of various types having the desired lubricating and cooling characteristics. The intermediate fluid may also be of various types that have a specific gravity greater than the selected motor fluid and are substantially non-soluble in the motor fluid so that an interface is formed between the motor fluid and the intermediate fluid. Further, an intermediate fluid is selected which has a higher specific gravity than the ambient fluid being pumped by the motor and pump unit. It has been found that an oil is a satisfactory motor fluid and that water is a satisfactory intermediate fluid in many situations and, therefore, for purposes of the following description and continuity of legends on FIGURES 6, 7, 8 and 9, the motor fluid, intermediate fluid, and ambient fluid will be referred to as "oil," "water" and "well fluid" respectively.

Referring particularly to FIG. 7, as the motor pump and seal section are lowered into the well there is usually an increase in temperature due to the higher temperature present in the bottom of the well. This increase in temperature causes expansion of the oil within the motor 10 and also the oil and water within the seal section 11. Moreover, when the motor is operated, there will be an additional increase in temperature of the oil causing further expansion. This fluid expansion causes fluid to be discharged upwardly through the breather tube 55, bore 54 and out into the well fluid. At first a small amount of water will be urged up the tube 55 until the interface 61 drops below the open end 56 of tube 55 whereupon oil will be permitted to flow into tube 55. The oil will rise in tube 55, bore 54 and chamber 44 in the form of droplets or a small stream of oil due to the oil having a lower specific gravity than the water present within that tube, bore and chamber. When the motor temperature reaches its maximum point and expansion of the oil stabilizes, the discharge of oil upwardly through tube 55 will cease and the interface 61 will be virtually aligned with the level of open ends 50, 53 and 56 of the tubes 49, 52 and 55, respectively. When the motor is shut down the temperature of the fluids within the motor and seal section will drop to approximately the temperature of the well fluid and, therefore, there will be a reduction in the actual volume of the fluids within the motor and seal section. Referring particularly to FIGURE 8, this reduction in volume will cause the water present within chamber 44, bore 54 and tube 55 to recede and be followed by the well fluid. This reduction in fluid volume cause the interface 61 between water oil and the water to rise within chamber 32. A second interface 62 is formed between the water within tube 55 and the well fluid within tube 55. As previously described, the volume of tube 55 is relatively large by providing a large tube or plurality of tubes so that upon this reduction of volume of fluid within the motor and seal section due to cooling, the interface 62 will not reach the open end 56 of tube 55. When the motor is again operated and the temperature of the oil is increased, the expansion of the oil will cause the interface 62 to rise within tube 55 and bore 54. This rise in interface 62 is caused by the water being urged up tube 55 and therefore the interface 61 is lowered within chamber 32. At maximum temperature of the oil, the fluids will again be substantially in the relative position shown in FIGURE 7. Repeated on-and-off cycling of the motor 10 causing expansion and contraction of the fluid within the motor and seal section merely causes the interface 62 to be raised or lowered, respectively, within tube 55, bore 54 and chamber 44. The interface 62 does not reach the lower open end 56 of tube 55 during this expansion and contraction, and therefore the well fluid does not enter chamber 32 or come in contact with the oil contained within chamber 32.

Referring now to FIGURE 9, a condition is shown wherein the shaft 18 is rotating and the uppermost seal 35 has failed or malfunctioned to cause fluid leakage through the seal. As previously described, the flow of this leakage will be in the direction from chamber 45 upwardly to chamber 44. The initial stages of leaking will result in the oil present within tube 49, bore 47, passageway 48 and chamber 45 being discharged through the seal 35 into chamber 44 where it will rise within any water present in chamber 44 and become mixed with the well fluid within chamber 44. However, this initial loss of oil to the well fluid reduces the total volume of oil and water within the seal section and therefore interface 61 will rise within chamber 32 and interface 62 will drop within bore 54 and tube 55. Since interface 61 rises above the open end 50 of tube 49 continued leakage of seal 35 causes water rather than oil to rise within tube 49, bore 47, passageway 48 and to pass through the seal in the direction of arrows 63. Since the water has a higher specific gravity than the well fluid, the water will fill the bottom of chamber 44 and rise within chamber 44 until the water reaches the opening to bore 54, whereupon the water will flow into bore 54 and down into tube 55 in the form of water droplets or a small stream of water. Thus, it may be seen that continued leakage of seal 35 does not cause a loss in the total volume of oil and water within the motor 10 and seal section 11, but rather merely results in circulation of the water upwardly through tube 49 and downwardly through tube 50. It is to be noted that the volume of tube 55 is still such that interface 62 does not reach the open end 56 during contraction of the fluid within the motor and seal section due to a lowering of temperature even though a small volume of oil has been lost during the initial stages of leakage of seal 35.

For the reasons previously described, it may be seen that upon failure of rotary seal 36, fluid will flow upwardly in tube 49, bore 47 and passageway 48 into chamber 45 and then pass through the seal into chamber 46. The fluid will then flow from chamber 46 down through bore 51 and tube 52 to be discharged back into the chamber 32. This circulating fluid may be either water or oil depending on the particular position of interface 61 which is in turn dependent on the temperature of the oil and water at that particular moment. Similarly, failure of rotary seal 37 will result in oil flowing from chamber 32 upwardly through the seal into chamber 46 and then downwardly through bore 51 and tube 52 back into chamber 32. The failure and resultant leakage of more than one of the rotary seals 35, 36 and 37 at one time will merely result in fluid flowing in a combination of the heretofore described directions.

Thus it may be seen that by this invention there has been provided a seal section employing two fluids which will accommodate expansion and contraction of the fluids due to on-and-off cycling of the motor with only one fluid being circulated through the motor and that fluid not coming in contact with the ambient fluid. Further, the inevitable leakage in a rotary seal does not result in an overall loss of fluid from the motor and seal section, but rather merely results in circulating this fluid through the leaking seal. Moreover, even during leakage of a rotary seal the motor fluid does not come in contact with the ambient fluid and thus harmful intermixing is avoided. Thus the failure of a rotary seal does not constitute a failure of the seal section until such rotary seal fails to such a pronounced degree as to permit seepage of ambient fluid into the seal section while the motor and pump are not operating.

Having fully described my invention it is to be understood that I do not wish to be limited to the details herein set forth or to the details illustrated in the drawings, but my invention is of the full scope of the appended claims.

What I claim is:

1. A submersible seal for an electric motor driving a pump by means of a shaft passing through the seal for protecting the motor from the intrusion of ambient fluid in which the motor, pump and seal are to be submerged, comprising: a housing having a chamber, means communicating the upper portion of said chamber with the motor, at least one rotary sealing means in said housing in sealing relation with the shaft above said chamber for sealing said chamber from the ambient fluid, second means communicating the lower portion of said chamber with the ambient fluid present above the uppermost said sealing means, lubricating fluid in said chamber, intermediate fluid in said chamber having a specific gravity greater than said lubricating fluid, and said intermediate fluid filling the lower portion of said chamber at least to the level of communication with said second communicating means and filling at least a portion of said second communicating means for separating the lubricating fluid in said chamber from the ambient fluid.

2. A submersible seal for an electric motor driving a pump by means of a shaft passing through the seal for protecting the motor from the intrusion of ambient fluid in which the motor, pump and seal are to be submerged, comprising: a housing having a chamber positioned above the motor, means communicating the upper portion of said chamber with the motor, a plurality of rotary sealing means in said housing in sealing relation with the shaft above said chamber for sealing said chamber from the ambient fluid, conduit means in said housing communicating the lower portion of said chamber with the ambient fluid present above the uppermost said sealing means, individual separate conduit means in said housing communicating the lower portion of said chamber with locations in said housing between each adjacent pair of said rotary sealing means, lubricating fluid in said chamber, intermediate fluid in said chamber having a specific gravity greater than said lubricating fluid, said intermediate fluid filling the lower portion of said chamber at least to the level of communication with the first said conduit means and filling at least a portion of the first said conduit means for separating the lubricating fluid in said chamber from the ambient fluid, and each of said rotary means functioning upon sealing failure to transfer fluid from one side of that sealing means to the other and such transferred fluid is drawn from said chamber and returned to said chamber, such fluid flow to and from the said chamber being through at least one of said conduit means.

3. A submersible seal for an electric motor driving a pump by means of a shaft passing through the seal for protecting the motor from the intrusion of ambient fluid in which the motor, pump and seal are to be submerged, comprising: a housing having a chamber positioned above the motor, means communicating the upper portion of said chamber with the motor, a plurality of rotary sealing means in said housing in sealing relation with the shaft above said chamber for sealing said chamber from the ambient fluid, conduit means in said housing communicating the lower portion of said chamber with the ambient fluid present above the uppermost said sealing means, said conduit means having a relatively large volumetric capacity, individual separate conduit means in said housing communicating the lower portion of said chamber with locations in said housing between each adjacent pair of said rotary sealing means, lubricating fluid in said chamber, intermediate fluid in said chamber having a specific gravity greater than both said lubricating fluid and the ambient fluid, said intermediate fluid filling the lower portion of said chamber at least to the level of communication with the first said conduit means and filling at least a portion of the first said conduit means for separating the lubricating fluid in said chamber from the ambient fluid, and each of said rotary sealing means functioning upon sealing failure to transfer fluid from one side of that sealing means to the other and such transferred fluid is drawn from said chamber and returned to said chamber, such fluid flow to and from the said chamber being through at least one of said conduit means.

4. A submersible seal for an electric motor driving a pump by means of a shaft passing through the seal for protecting the motor from the intrusion of ambient fluid in which the motor, pump and seal are to be submerged, comprising: a housing having a chamber positioned above the motor, means communicating the upper portion of said chamber with the motor, a plurality of rotary sealing means in said housing in sealing relation with the shaft above said chamber for sealing said chamber from the ambient fluid, conduit means in said housing communicating the lower portion of said chamber with the ambient fluid present above the uppermost said sealing means, said conduit means having a relatively large volumetric capacity, individual separate conduit means in said housing communicating the lower portion of said chamber with locations in said housing between each adjacent pair of said rotary sealing means, each of said conduit means having an open end in the lower portion of said chamber at substantially the same level, lubricating fluid in said chamber, intermediate fluid in said chamber having a specific gravity greater than both said lubricating fluid and the ambient fluid, said lubricating fluid being relatively nonsoluble in said intermediate fluid, an interface formed between said lubricating and intermediate fluid, said intermediate fluid filling the lower portion of said chamber with the said interface at least up to the level of the first said conduit means, the intermediate fluid filling at least the lower portion of the first said conduit means for separating the fluids in said chamber from the ambient fluid during expansion and contraction of the fluids within the chamber and motor, and each of said rotary sealing means functioning upon sealing failure to transfer fluid from one side of that sealing means to the other and such transferred fluid is drawn from said chamber and returned to said chamber, such fluid flow to and from the said chamber being through at least one of said conduit means.

5. A submersible seal for an electric motor driving a pump by means of a shaft passing through the seal for protecting the motor from the intrusion of ambient fluid in which the motor, pump, and seal are to be submerged, comprising: a housing having a chamber positioned above the motor, means communicating the upper portion of said chamber with the motor, a plurality of spaced-apart rotary sealing means in said housing in sealing relation with the shaft above said chamber for sealing said chamber from the ambient fluid, conduit means in said housing establishing a level of communication adjacent the lower portion of said chamber with the ambient fluid present above the uppermost said sealing means, individual separate conduit means in said housing communicating the lower portion of said chamber with at least one location in said housing between adjacent rotary sealing means to provide a flow path thereto, lubricating fluid in said chamber, intermediate fluid in said chamber having a specific gravity greater than said lubricating fluid, said intermediate fluid filling the lower portion of said chamber at least to the level of communication with the first said conduit means and filling at least a portion of the first said conduit means for separating the lubricating fluid in said chamber from the ambient fluid.

6. A submersible seal for an electric motor driving a pump by means of a shaft passing through the seal for protecting the motor from the intrusion of ambient fluid in which the motor, pump, and seal are to be submerged, comprising: a housing having a chamber positioned above the motor, means communicating the upper portion of said chamber with the motor, a plurality of rotary sealing means in said housing in sealing relation with the shaft above said chamber for sealing said chamber from the ambient fluid, lubricating fluid in said chamber, intermediate fluid in said chamber having a specific gravity greater than both said lubricating fluid and the ambient fluid so as to cause said intermediate fluid to normally fill the lower portion of said chamber, conduit means in said housing communicating the ambient fluid present above the uppermost said sealing means to said lower portion of said chamber at a level of communication with said intermediate fluid, said conduit means having at least a portion thereof filled with said intermediate fluid, and having a volumetric capacity at least as great as the combined change in volume of the lubricating fluid and intermediate fluid which change in volume results from exposure of said seal to different temperatures and pressures, and individual separate conduit means in said housing communicating the lower portion of said chamber with locations in said housing between each adjacent pair of said rotary sealing means to provide a flow path from said chamber to said locations.

7. A submersible seal for an electric motor driving a pump by means of a shaft passing through the seal for protecting the motor from the intrusion of ambient fluid in which the motor, pump, and seal are to be submerged, comprising: a housing having a chamber positioned above the motor, means communicating the upper portion of said chamber with the motor, a plurality of spaced-apart rotary sealing means in said housing in sealing relation with the shaft above said chamber for sealing said chamber from the ambient fluid, conduit means in said housing establishing a level of communication adjacent the lower portion of said chamber with the ambient fluid present above the uppermost said sealing means, said conduit means having a relatively large volumetric capacity, individual separate conduit means in said housing communicating the lower portion of said chamber with at least one location in said housing between adjacent rotary sealing means to provide a flow path thereto, each of said conduit means having an open end in the lower portion of said chamber at substantially the same level, lubricating fluid in said chamber, intermediate fluid in said chamber having a specific gravity greater than both said lubricating fluid and the ambient fluid, said lubricating fluid being relatively non-soluble in said intermediate fluid, an interface formed between said lubricating and intermediate fluid, said intermediate fluid filling the lower portion of said chamber with the said interface at least up to the level of the first said conduit means, the intermediate fluid filling at least the lower portion of the first said conduit means for separating the fluids in said chamber from the ambient fluid during expansion and contraction of the fluids within the chamber and motor.

References Cited by the Examiner
UNITED STATES PATENTS

| | | | |
|---|---|---|---|
| 2,418,194 | 4/47 | Piccardo | 277—3 |
| 2,427,656 | 9/47 | Blom | 277—62 X |

MILTON O. HIRSHFIELD, *Primary Examiner.*

DAVID X. SLINEY, *Examiner.*